US009692312B2

(12) United States Patent
Yuasa et al.

(10) Patent No.: US 9,692,312 B2
(45) Date of Patent: Jun. 27, 2017

(54) POWER CONVERSION APPARATUS, AND AIR-CONDITIONING APPARATUS USING THE SAME

(71) Applicant: Mitsubishi Electric Corporation, Tokyo (JP)

(72) Inventors: Kenta Yuasa, Tokyo (JP); Shinsaku Kusube, Tokyo (JP); Akihiro Tsumura, Tokyo (JP); Takuya Shimomugi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/897,250

(22) PCT Filed: Sep. 30, 2013

(86) PCT No.: PCT/JP2013/076491
§ 371 (c)(1),
(2) Date: Dec. 10, 2015

(87) PCT Pub. No.: WO2015/045138
PCT Pub. Date: Apr. 2, 2015

(65) Prior Publication Data
US 2016/0126854 A1 May 5, 2016

(51) Int. Cl.
*H02M 5/458* (2006.01)
*H02P 27/06* (2006.01)
(Continued)

(52) U.S. Cl.
CPC ............ *H02M 5/458* (2013.01); *F25B 31/02* (2013.01); *H02M 1/32* (2013.01); *H02M 1/4225* (2013.01);
(Continued)

(58) Field of Classification Search
CPC ...... H02M 5/458; H02M 1/32; H02M 1/4225; H02M 7/06; F25B 31/02; H02P 27/06
(Continued)

(56) References Cited

U.S. PATENT DOCUMENTS

| 2002/0067630 A1* | 6/2002 | Tokunaga | ........... H02M 1/4208 363/125 |
| 2013/0154536 A1* | 6/2013 | Park | ...................... H02M 7/797 318/503 |
| 2013/0334896 A1* | 12/2013 | Yamamoto | ............ B60L 11/182 307/104 |

FOREIGN PATENT DOCUMENTS

| JP | S60-043069 A | 3/1985 |
| JP | S60-077290 U | 5/1985 |

(Continued)

OTHER PUBLICATIONS

International Search Report of the International Searching Authority mailed Dec. 10, 2013 for the corresponding international application No. PCT/JP2013/076491 (and English translation).
(Continued)

*Primary Examiner* — Jue Zhang
(74) *Attorney, Agent, or Firm* — Posz Law Group, PLC

(57) ABSTRACT

A power conversion apparatus includes a rectifier, a converter including a reactor, a switching element, and a reverse current prevention element, a smoothing capacitor configured to smooth the output voltage, a current detector configured to detect a reactor current, a voltage detector configured to detect the output voltage, and a converter control unit configured to control operation of the switching element of the converter. The converter-control unit includes a switching command calculation unit configured to calculate a switching command value responsive to a ratio of the rectified voltage to the output voltage in accordance with the output voltage and the reactor current, a switching control
(Continued)

unit configured to control operation of the switching element in accordance with the switching command value, and a supply abnormality determination unit configured to determine occurrence of a momentary power failure or voltage sag in accordance with the switching command value.

11 Claims, 4 Drawing Sheets

(51) Int. Cl.
*H02M 1/32* (2007.01)
*H02M 1/42* (2007.01)
*F25B 31/02* (2006.01)
*H02M 7/06* (2006.01)
*H02M 1/00* (2006.01)
*F24F 11/00* (2006.01)

(52) U.S. Cl.
CPC .............. *H02M 7/06* (2013.01); *H02P 27/06* (2013.01); *F24F 11/0009* (2013.01); *H02M 2001/007* (2013.01); *Y02B 70/126* (2013.01)

(58) Field of Classification Search
IPC ........................................................ H02P 27/06
See application file for complete search history.

(56) References Cited

FOREIGN PATENT DOCUMENTS

| | | | |
|---|---|---|---|
| JP | H10-146045 | A | 5/1998 |
| JP | 2004-364416 | A | 12/2004 |
| JP | 2005-051932 | A | 2/2005 |
| JP | 2006-087235 | A | 3/2006 |
| JP | 2009-100498 | A | 5/2009 |
| JP | 2010-074895 | A | 4/2010 |
| JP | 5063379 | B2 | 8/2012 |
| JP | 2013-188004 | A | 9/2013 |

OTHER PUBLICATIONS

Office Action mailed Oct. 11, 2016 issued in corresponding JP patent application No. 2015-538771 (and English translation).
Office Action dated Apr. 24, 2017 issued in corresponding CN patent application No. 201380078550.9 (and English Translation).

* cited by examiner

POWER CONVERSION APPARATUS, AND AIR-CONDITIONING APPARATUS USING THE SAME

CROSS REFERENCE TO RELATED APPLICATION

This application is a U.S. national stage application of International Application No. PCT/JP2013/076491 filed on Sep. 30, 2013, the disclosure of which is incorporated herein by reference.

TECHNICAL FIELD

The present invention relates to a power conversion apparatus including a switching element, and an air-conditioning apparatus using the same.

BACKGROUND ART

In existing air-conditioning apparatuses, a method is dominant in which a motor used in a compressor, a fan, or the like is driven using an inverter circuit in order to operate the motor with high efficiency so as to achieve energy savings. In this method, alternating-current power supplied from a commercial power supply is temporarily converted into direct-current power by an AC-DC converter, and the converted direct-current power is converted into alternating-current power having a certain voltage and frequency by an inverter and supplied to the motor. For further energy savings, in recent years, a power conversion apparatus has been known in which a DC-DC converter (booster circuit) is provided on the input side of an inverter. This booster circuit controls an input current in accordance with an ON/OFF state of a semiconductor switching element. Then, there is known a method in which a rectified output of an AC-DC converter is raised in voltage in the booster circuit and is input to the inverter, or a method in which an alternating-current voltage is converted into a direct-current voltage by using a PWM converter.

Incidentally, when a load connected to a power system changes suddenly, or when the power system is, for example, struck by lightning, a brief system shutdown called a momentary power failure may occur. Furthermore, a voltage sag, which is a momentary reduction in voltage, may occur due to a lightning strike or the like. Since the booster circuit controls an input current in accordance with ON/OFF operation of the semiconductor switching element, if a sudden change in power-supply voltage due to a momentary power failure or a momentary voltage sag occurs, an overcurrent occurs in the semiconductor switching element, and an output voltage from a converter unit may change suddenly. At this time, operation of the inverter located at a stage subsequent to the converter unit becomes unstable, and operation of a load, such as a motor, may stop due to a loss of synchronization.

Thus, hitherto, various techniques have been proposed to prevent a malfunction due to a momentary power failure or a momentary voltage sag (see, for example, Patent Literatures 1 and 2). Patent Literature 1 discloses a stabilized power supply apparatus that includes an abnormality detection circuit to detect an abnormality in input voltage, and that effects emergency stopping of a converter unit when the abnormality detection circuit detects an abnormality. Patent Literature 2 discloses a power conversion apparatus that determines, on the basis of a variation in current value, the occurrence of an abnormality in which a power-supply voltage temporarily increases.

CITATION LIST

Patent Literature

Patent Literature 1: Japanese Unexamined Patent Application Publication No. 10-146045
Patent Literature 2: Japanese Patent No. 5063379

SUMMARY OF INVENTION

Technical Problem

However, there are circumstances in which the amount of change in voltage increases at the time of activation, stopping, or the like of a system in addition to a momentary power failure or a momentary voltage sag. Thus, as in Patent Literatures 1 and 2, in the case where an abnormality, which is a momentary power failure or a momentary voltage sag, is detected by detection of a current or detection of a voltage, it is difficult to detect the occurrence of a momentary power failure or a momentary voltage sag, as distinguished from the detection at the time of activation or the like. Furthermore, if a determination value is not set exactly, an abnormality is frequently detected. On the other hand, in order to detect the occurrence of a momentary power failure or a momentary voltage sag without performing false detection due to a change in current or voltage during normal operation, tuning is needed for each model, thereby resulting in an increase in design load.

The present invention has been accomplished to solve such problems, and an object thereof is to provide a power conversion apparatus that can detect the occurrence of a momentary power failure or a momentary voltage sag with ease and accuracy, and an air-conditioning apparatus using the same.

Solution to Problem

A power conversion apparatus of the present invention includes: a rectifier configured to rectify an alternating-current voltage supplied from an alternating-current power supply; a converter unit including a reactor connected to an output terminal of the rectifier, a reverse current prevention element connected in series with the reactor, and a switching element connected between the reactor and the reverse current prevention element, and being configured to raise a rectified voltage rectified by the rectifier and output the rectified voltage as an output voltage; a smoothing capacitor configured to smooth the output voltage output from the converter unit; a current detection unit configured to detect a reactor current flowing to the reactor; a voltage detection unit configured to detect the output voltage output from the converter unit; and a converter control unit configured to control operation of the switching element of the converter unit. The converter control unit includes a switching command calculation unit configured to calculate a switching command value responsive to a ratio of the rectified voltage to the output voltage in accordance with the output voltage detected by the voltage detection unit and the reactor current detected by the current detection unit, a switching control unit configured to control operation of the switching element in accordance with the switching command value calculated by the switching command calculation unit, and a supply abnormality determination unit configured to determine occurrence of a momentary power failure or a momentary voltage sag in accordance with the switching command value.

Advantageous Effects of Invention

According to the power conversion apparatus of the present invention, a momentary power failure or a momentary voltage sag is detected on the basis of the switching command value, and thus a momentary power failure or a momentary voltage sag can be detected with ease and accuracy on the basis of a finding that the switching command value is high at the time of a momentary power failure or a momentary voltage sag without adding another component for determining a momentary power failure or a momentary voltage sag.

DESCRIPTION OF EMBODIMENTS

Figure 1:
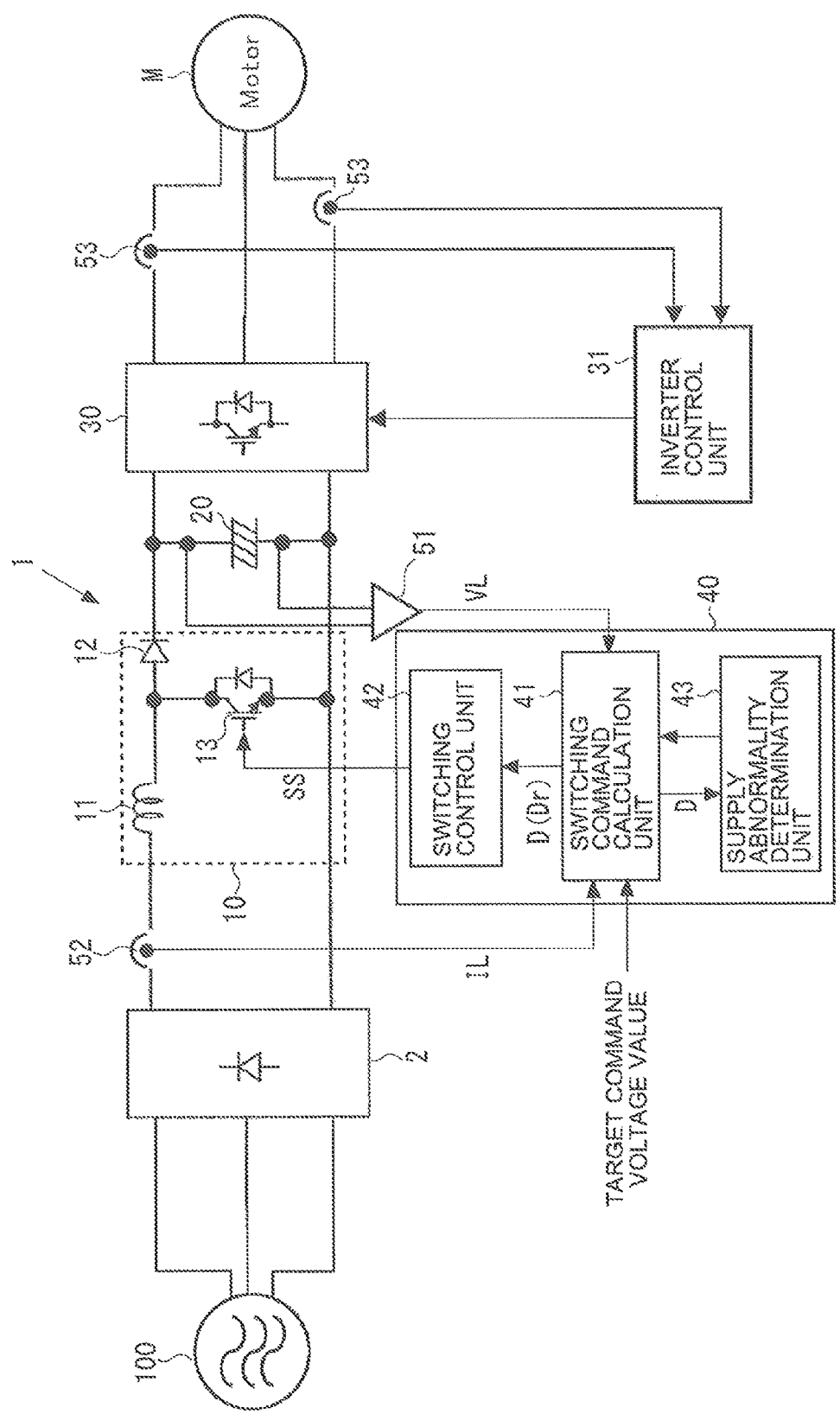
FIG. 1 is a circuit diagram illustrating Embodiment 1 of a power conversion apparatus of the present invention.

Embodiment of a power conversion apparatus of the present invention will be described below with reference to the drawings. FIG. 1 is a circuit diagram illustrating Embodiment 1 of the power conversion apparatus of the present invention, and a power conversion apparatus 1 will be described with reference to FIG. 1. The power conversion apparatus 1 in FIG. 1 is connected to a load M, such as a motor of a compressor or fan, in, for example, an air-conditioning apparatus, and supplies an alternating current having predetermined frequency to the load M. The power conversion apparatus 1 includes a rectifier 2, a converter unit 10, a smoothing capacitor 20, and an inverter unit 30. The rectifier 2 is an AC-DC converter that converts an alternating-current voltage (for example, AC 200 V) of a three-phase alternating-current power supply 100 into a direct-current voltage, and is composed of a three-phase full-wave rectifier including, for example, six diodes connected in a bridge configuration.

The converter unit 10 is a DC-DC converter (boost chopper circuit) that raises the direct-current voltage output from the rectifier 2 to a certain voltage (for example, DC 365 V), and includes a reactor 11 for raising voltage, a reverse current prevention element (reverse current prevention diode) 12, and a switching element 13. The reactor 11 is connected to an output terminal of the rectifier 2, and the reverse current prevention element 12 is connected in series with the reactor. Then, the switching element 13 is connected between the reactor 11 and the reverse current prevention element 12. The switching element 13 is turned ON/OFF in accordance with input of a switching signal SS, and this switching signal SS is transmitted from a converter control unit 40. In particular, an output voltage VL of the converter unit 10 is controlled by the converter control unit 40 so as to reach a target command voltage V0. The switching element 13 is composed of a semiconductor device, such as a MOFET or IGBT, or a wide band gap semiconductor, such as a silicon carbide (SiC) device, gallium nitride (GaN), or a diamond device, which has a larger band gap than, for example, a silicon (Si) device.

Then, when the switching element 13 is turned ON, a voltage rectified by the rectifier 2 is applied to the reactor 11, and conduction is blocked by the reverse current prevention element 12. On the other hand, when the switching element 13 is turned OFF, the reverse current prevention element 12 conducts, and a voltage in a direction opposite to a direction when the switching element 13 is ON is induced in the reactor 11. At this time, energy accumulated in the reactor 11 when the switching element 13 is ON is transferred to a smoothing capacitor 20 side when the switching element 13 is OFF. The on-duty of the switching element 13 is controlled, and thus the output voltage VL from the converter unit 10 is controlled. Then, the smoothing capacitor 20 smooths the output voltage VL output from the converter unit 10.

Furthermore, the power conversion apparatus 1 includes an output voltage detection sensor 51 that detects a voltage accumulated in the smoothing capacitor 20 as the output voltage VL output from the converter unit 10, and a current detection sensor 52 that detects a reactor current IL flowing to the reactor 11.

The inverter unit 30 converts direct-current power smoothed and stored by the smoothing capacitor 20 into alternating-current power, and is composed of a plurality of switching elements. The inverter unit 30 is connected to the load M. such as the motor of the compressor, in, for example, the air-conditioning apparatus, and supplies an alternating current having predetermined frequency to the load M. Operation of the inverter unit 30 is controlled by an inverter control unit 31. Then, the inverter control unit 31 controls the operation of the inverter unit 30 through, for example, PWM control, and outputs a drive signal to the inverter unit 30 to control frequency of power to be output to the load M. Furthermore, motor current detection sensors 53 are provided, and the inverter control unit 31 detects a rotation speed of the load M on the basis of output currents detected by the motor current detection sensors 53, and performs switching control of the inverter unit 30.

Figure 2:
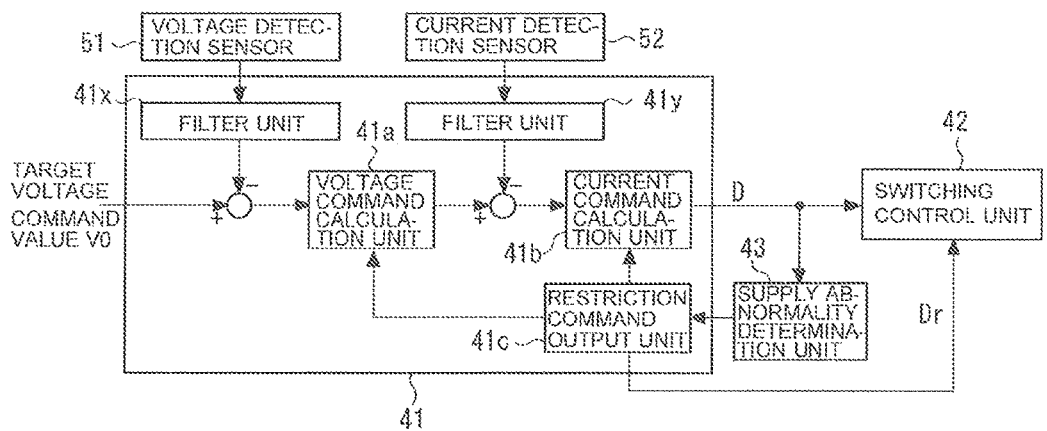
FIG. 2 is a block diagram illustrating an example of a converter control unit in the power conversion apparatus in FIG. 1.

FIG. 2 is a block diagram illustrating an example of the converter control unit in the power conversion apparatus, and the converter control unit 40 will be described with reference to FIG. 1 and FIG. 2. It is noted that the configuration of the converter control unit 40 in FIG. 1 and FIG. 2 is constructed by executing a program stored in a microprocessor. The converter control unit 40 controls operation of the switching element 13 to thereby control the output voltage VL output from the converter unit 10. The converter control unit 40 includes a switching command calculation unit 41, a switching control unit 42, and a supply abnormality determination unit 43.

The switching command calculation unit 41 calculates a switching command value (on-duty command value) D, and includes a voltage command calculation unit 41a, a current command calculation unit 41b, and a restriction command output unit 41c. The voltage command calculation unit 41a obtains a voltage command value from a difference between the target command voltage V0, which is a target, and the output voltage VL detected by the output voltage detection sensor 51 and subjected to noise removal by a filter unit 41x. It is noted that, as a method of calculating a voltage command value in the voltage command calculation unit 41a, a known technique, such as proportional control or integral control, can be used. Furthermore, although the case where the filter unit 41x performs a filtering process through software processing is presented as an example, the filtering process may be performed through hardware (a filter circuit).

The current command calculation unit 41b calculates the switching command value D by using a difference between the reactor current IL detected by the current detection sensor 52 and subjected to noise removal by a filter unit 41y, and the voltage command value calculated by the voltage command calculation unit 41a. It is noted that, as a method of calculating a current command value in the current command calculation unit 41b, a known technique, such as proportional control, integral control, or derivative control, can be used. Furthermore, although the case where the filter unit 41x performs a filtering process through software processing is presented as an example, the filtering process may be performed through hardware (a filter circuit).

Figure 3:
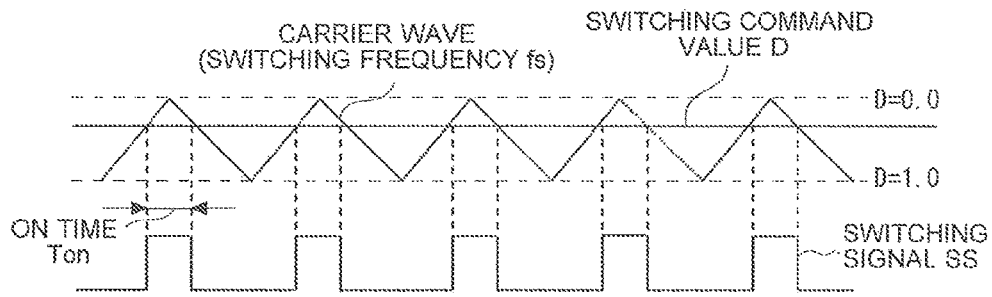
FIG. 3 is a graph illustrating an example of operation of a switching control unit in FIG. 2.

The switching control unit 42 generates the switching signal SS by using the switching command value D calculated in the switching command calculation unit 41, and controls the switching element 13 on the basis of the switching signal SS. Specifically, FIG. 3 is a graph illustrating an example of operation of the switching control unit 42 in FIG. 2. As illustrated in FIG. 3, the switching control unit 42 generates the switching signal (pulse signal) SS in which a period during which a level of a triangular wave having predetermined frequency (switching frequency fs) is more than or equal to the switching command value D denotes an ON time, and a period during which the level of the triangular wave is smaller than the switching command value denotes an OFF period. An ON time Ton increases as the switching command value D increases, and the ON time Ton decrease as the switching command value D decreases.

Figure 4:
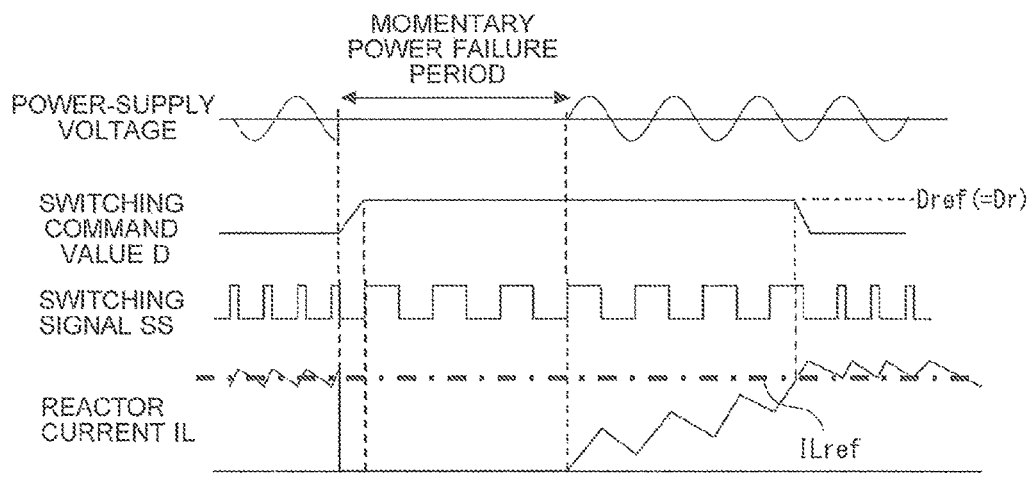
FIG. 4 is a graph illustrating operating waveforms at the time of a momentary power failure in the power conversion apparatus in FIG. 1.

The supply abnormality determination unit 43 determines the occurrence of a momentary power failure or a momentary voltage sag on the basis of the switching command value D. Here, FIG. 4 is a graph illustrating operating waveforms in the power conversion apparatus in FIG. 1. As illustrated in FIG. 4, a sudden change in power-supply voltage due to a momentary power failure may occur in the above-described power conversion apparatus 1. At this time, an overcurrent occurs from the three-phase alternating-current power supply 100 through the switching element 13, and the output voltage VL of the converter unit 10 may change suddenly. Typically, in the case where a voltage is raised in the converter unit 10, assuming that a yet-to-be-raised rectified voltage is denoted by Vd, a target command voltage is denoted by V0, and a switching command value is denoted by D, the following Expression (1) is given.
[Math. 1]

$$D=(V0-Vd)/V0 \quad (1)$$

If a momentary power failure occurs, a relationship of power-supply voltage Vs=0 (rectified voltage Vd=0) is satisfied, and Expression (1) gives switching command value D=1. This denotes that the switching element 13 remains ON, and also denotes that the switching element 13 remains ON during a time period from when the momentary power failure occurs to when power is restored. If power is restored from the momentary power failure with the switching element 13 remaining ON, an excessively large current flows in the inverter unit 30 in one go.

Furthermore, a momentary power failure period is a period during which the reactor current IL does not increase at all, and a difference from the switching command value increases. In particular, if an integrator is used in the voltage command calculation unit 41a and the current command calculation unit 41b, a difference from each command value continues to be accumulated even during the momentary power failure, and control may fail. In addition, in order that the accumulated amount of control returns to its original level, a time period taken for the accumulation is needed, thereby reducing responsiveness at the time of power restoration.

Hence, the supply abnormality determination unit 43 in FIG. 1 and FIG. 2 determines, on the basis of the switching command value D, whether or not a momentary power failure has occurred. Specifically, a set threshold value Dref denoting the occurrence of a momentary power failure is set in the supply abnormality determination unit 43, and it is determined that a momentary power failure has occurred if the switching command value exceeds the set threshold value Dref.

This set threshold value Dref is, for example, 0.5, and thus the set threshold value Dref is set so that it is not reached in normal operation. That is, assuming that a power-supply voltage supplied from the three-phase alternating-current power supply 100 is Vs, a maximum value of the rectified voltage Vd which has been rectified is $2^{(1/2)} \cdot Vs$, and a minimum value thereof is $6^{(1/2)} \cdot Vs/2$. Thus, the minimum value and the maximum value of the rectified voltage Vd during normal operation are known. Hence, as represented by Expression (1), when the power-supply voltage Vs and the target command voltage V0 are determined, a maximum value and a minimum value of the switching command value are determined. For example, when a voltage of 170 V is supplied from the three-phase alternating-current power supply 100 to the converter unit 10, and the converter unit 10 raises the voltage to DC 365 V, the maximum of the switching command value D during normal operation is 0.43. On the other hand, as described above, when a momentary power failure occurs, the power-supply voltage is zero (rectified voltage Vd=0), and Expression (1) gives switching command value D=1.0.

Consequently, as the set threshold value Dref, a larger value than the maximum switching command value calculated during normal operation is set in the supply abnormality determination unit 43. This can prevent false detection in which it is determined that an abnormality has occurred although no momentary power failure has occurred. In particular, the switching command value D is a result obtained by calculation using values obtained by performing the filtering processes on the output voltage VL detected in the output voltage detection sensor 51 and the reactor current IL detected in the current detection sensor 52, therefore enabling a highly-reliable determination.

The switching command calculation unit 41 further includes the restriction command output unit 41c that outputs a restriction switching command value Dr to the switching control unit 42 if the supply abnormality determination unit 43 determines that the switching command value D is larger than the set threshold value Dref and is abnormal. Hence, the restriction switching command value Dr is output to the switching control unit 42, and the switching control unit 42 performs control so that ON/OFF operation of the switching element 13 is repeated during momentary stopping although a current does not flow as illustrated in FIG. 4.

For this reason, the switching element 13 is put into a state of switching operation immediately after power restoration, and the reactor current IL increases not suddenly but gradually. Hence, the occurrence of an overcurrent due to the fact that switching command value D=1 is set and power is restored with the switching element 13 remaining ON is prevented, and thus prevention of the rapid growth of current due to the fact that power is restored with the switching element 13 remaining ON can prevent the occurrence of an overcurrent. Furthermore, current is drawn immediately upon restoration from a momentary power failure, control can thereby be performed so that quick restoration to a normal state is performed, and thus the probability of emergency stopping can be reduced.

The restriction command output unit 41c in FIG. 2 further has a function of stopping part or all of control operations performed by the voltage command calculation unit 41a and the current command calculation unit 41b while outputting the restriction switching command value Dr during a momentary power failure. This can enhance responsiveness from the occurrence of a momentary power failure to switching to control using the restriction switching command value Dr. That is, since the voltage command calculation unit 41a and the current command calculation unit 41b calculate a switching command value while accumulating a detected voltage, a detected current, and a calculated command value, there is a problem in that responsiveness at the time of power restoration is poor. Furthermore, the filter units 41x and 41y perform noise removal, that is, when detection values (a voltage value and a current value) detected by the detection sensors are used for calculation, a filtering process is typically performed in which noise removal is performed in hardware processing and software processing. Although the filtering process is effective in terms of measures against noise, but responsiveness is reduced. For this reason, when an abnormality is detected, if the voltage command calculation unit 418 and the current command calculation unit 41b calculate a switching command value responsive to the abnormality, responsiveness from the abnormality detection to switching of the switching command value may be reduced.

Hence, at the time when the supply abnormality determination unit 43 determines that an abnormality has occurred, the restriction command output unit 41c stops calculation of the switching command value D and outputs the preset restriction switching command value Dr. This can enhance responsiveness at the time of the occurrence of a momentary power failure, and thus can prevent the occurrence of an overcurrent at the time of power restoration with certainty.

The supply abnormality determination unit 43 further has a function of determining, by using the reactor current IL, whether or not power has been restored after a momentary power failure occurred. The supply abnormality determination unit 43 determines whether or not the reactor current IL is more than or equal to a power restoration threshold value ILref, and determines that power has been restored when the reactor current IL is more than or equal to the power restoration threshold value ILref. It is noted that the power restoration threshold value ILref set in the supply abnormality determination unit 43 may be a preset value, and the supply abnormality determination unit 43 has a function of storing the reactor current IL at predetermined intervals, and the power restoration threshold value ILref may be a value of the reactor current IL just before the occurrence of a momentary power failure called when the momentary power failure occurs. Then, if the supply abnormality determination unit 43 determines that power has been restored, the switching command calculation unit 41 disables output of the restriction switching command value Dr, and calculates and outputs the switching command value D based on the output voltage VL, the reactor current IL, and the target command voltage V0 as described above.

Here, an amount of current growth ΔI immediately after power restoration depends on the ON time Ton of the switching element 13 and an inductance value of the reactor 11. That is, the amount of current growth ΔI at the time of power restoration can be represented by the following Expression (2).

[Math. 2]

$$\text{amount of current growth } \Delta I = (\text{rectified voltage } Vd/\text{inductance value}) \times \text{ON time Ton} \quad (2)$$

Then, when power is restored, the reactor current IL automatically flows through switching performed by the switching control unit 42. In switching control using the above-described restriction switching command value Dr, the ON time Ton is restricted to a switching command so as to prevent the occurrence of an overcurrent at the time of power restoration. On the other hand, in Expression (2), even when a short ON time Ton is set, if the inductance value is excessively small, the amount of current growth ΔI increases, and emergency stopping is likely to be affected. Hence, the reactor 11 has an inductance value at which switching can be performed at least once or more than once at the time of power restoration.

Specifically, as represented by Expression (2), the ON time Ton is determined by switching frequency fs of the switching element 13 and the restriction switching command value Dr, and the rectified voltage Vd is determined by the power-supply voltage Vs. The amount of current growing in one switching event is small if the inductance value is large, and the amount of current growing in one switching event increases as the inductance value decreases. Hence, an inductance value is selected so that emergency stopping is not affected even if current grows in one switching event.

It is noted that, although the case where an inductance value is selected so that the amount of current growth ΔI is reached in one switching event is presented as an example, the switching frequency fs may be increased with respect to that during normal operation, and thus the ON time Ton may be reduced. Specifically, the switching control unit 42 has a function of generating switching signals SS by using different switching frequencies fs1 and fs2 (fs1<fs2), generates the switching signal SS by using the switching frequency fs1 during normal operation, and generates the switching signal SS by using the switching frequency fs2 when an abnormality determination is made. That is, if the restriction switching command value Dr is set, the switching signal SS having a fixed duty ratio is output. If the duty ratio is fixed, the ON time Ton for the case of the switching frequency fs2 is smaller than that for the case of the switching frequency fs1, and thus the occurrence of an overcurrent at the time of power restoration can be prevented as represented by the above Expression (2). In particular, the use of SiC having excellent fast switching characteristics as the switching element 13 can reduce the amount of current growth ΔI per switching event and also contribute to an improvement in efficiency during normal operation owing to low switching loss.

Figure 5:
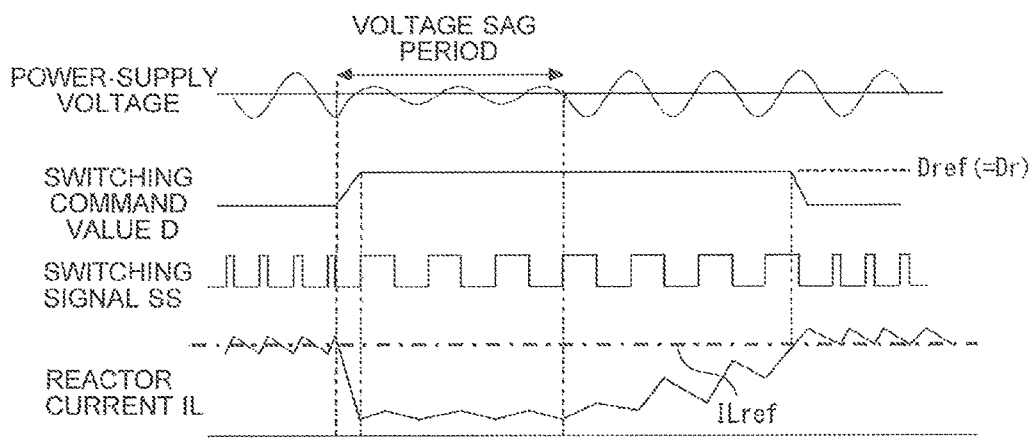
FIG. 5 is a graph illustrating operating waveforms at the time of a voltage sag in the power conversion apparatus in FIG. 1.
Figure 6:
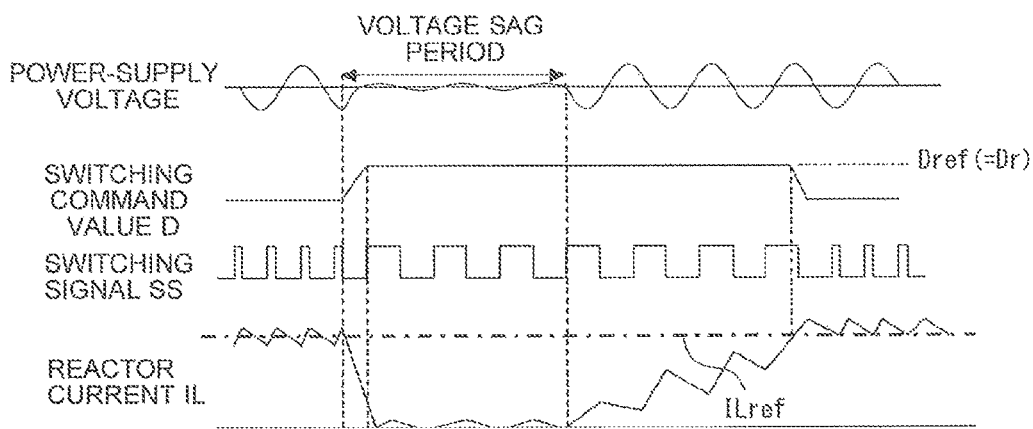
FIG. 6 is a graph illustrating operating waveforms at the time of a voltage sag in the power conversion apparatus in FIG. 1.

Furthermore, although FIG. 4 illustrates the case of a momentary power failure, the same also applies to the case of a voltage sag. FIG. 5 and FIG. 6 are graphs each illustrating operating waveforms when a voltage sag occurs. It is noted that FIG. 5 illustrates operating waveforms at the time of a voltage sag in which the reactor current IL is continuous, and FIG. 6 illustrates operating waveforms at the time of a voltage sag in which the reactor current IL is discontinuous. As illustrated in FIG. 5 and FIG. 6, the switching command value D also increases toward 1 suddenly when a voltage sag occurs, the supply abnormality determination unit 43 therefore determines that the switching command value D has exceeded the set threshold value Dref, and the switching command calculation unit 41 outputs the restriction switching command value Dr to the switching control unit 42.

Figure 7:
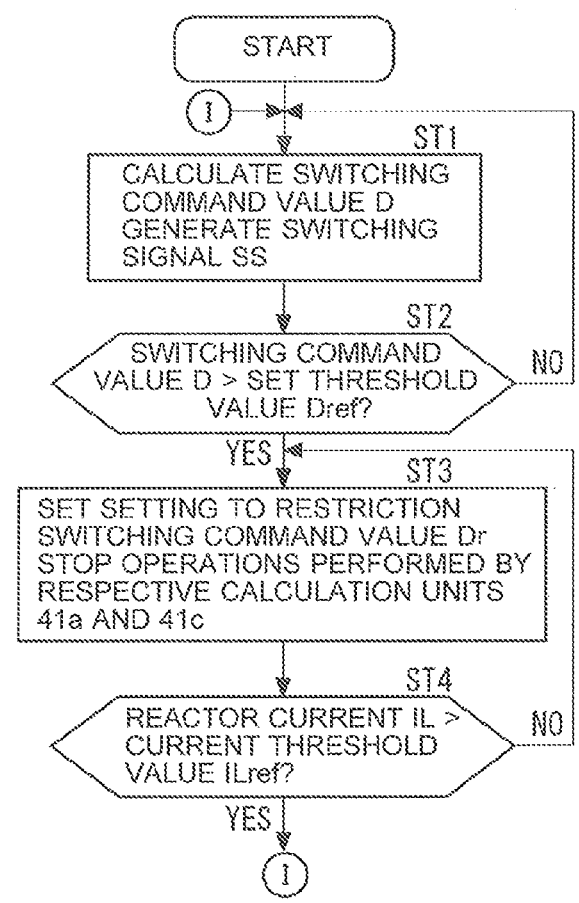
FIG. 7 is a flowchart illustrating an example of operations performed by the power conversion apparatus in FIG. 1.

FIG. 7 is a flowchart illustrating an example of operations performed by the converter control unit in FIG. 1, and an example of operations performed by the converter control unit 40 will be described with reference to FIG. 1 to FIG. 7. First, the power-supply voltage Vs supplied from the three-phase alternating-current power supply 100 is rectified in the rectifier 2 and is output as the rectified voltage Vd. Subsequently, the rectified voltage Vd is raised in the converter unit 10, and the output voltage (direct-current bus voltage) VL is applied to the smoothing capacitor 20. At this time, in the converter control unit 40, operation of the converter unit 10 is controlled so that the output voltage VL reaches the target command voltage V0. The output from the converter unit 10 is converted from DC to AC in the inverter unit 30, and is applied to the load M, such as a motor.

At this time, in the switching command calculation unit 41, the switching command value D is calculated on the basis of the target command voltage V0, the output voltage VL, and the reactor current IL. Then, the switching signal SS based on the switching command value D is generated by the switching control unit 42, and switching operation of the switching element 13 is controlled (step ST1). Then, the supply abnormality determination unit 4 determines, on the basis of the switching command value 0, whether or not an abnormality due to a momentary power failure or a momentary voltage sag has occurred (step ST2). If the switching command value D is less than or equal to the set threshold value Dref, it is determined that no momentary power failure has occurred, and automatic switching control performed by the above-described converter control unit 40 continues (steps ST1 and ST2).

On the other hand, if the switching command value D is larger than the set threshold value Dref, the supply abnormality determination unit 43 determines that a momentary power failure or a momentary voltage sag has occurred. Then, in the switching command calculation unit 41, the switching command value D is set to the restriction switching command value Dr (step ST3). Then, the switching control unit 42 performs switching control based on the restriction switching command value Dr.

Furthermore, while switching control based on the restriction switching command value Dr is being performed, the supply abnormality determination unit 43 determines whether or not the reactor current IL has exceeded the current threshold value ILref (step ST4). If the reactor current IL is less than or equal to the current threshold value ILref, it is determined that a momentary power failure or the momentary voltage sag has continued, and switching control based on the restriction switching command value Dr continues (steps ST3 and ST4).

On the other hand, if the reactor current IL exceeds the current threshold value ILref, the supply abnormality determination unit 43 determines that power has been restored from a momentary power failure or the momentary voltage sag. Then, in the switching command calculation unit 41, output of the restriction switching command value Dr is disabled, the switching command value D based on the output voltage VL and the reactor current IL is calculated, and switching control using the calculated switching command value D and control based on detection of a momentary power failure or the like are performed (steps ST1 to ST4).

According to the above-described Embodiment, a momentary power failure or a momentary voltage sag is detected on the basis of the switching command value D, and thus a momentary power failure or a momentary voltage sag can be detected with ease and accuracy on the basis of a finding that the switching command value D is high at the time of a momentary power failure or a momentary voltage sag without adding another component for determining a momentary power failure or a momentary voltage sag.

That is, as in the related art, in the case where an abnormality in power-supply voltage is detected, an abnormality detection circuit for detecting an abnormality in power-supply voltage is needed, and the footprint of the abnormality detection circuit is also needed, thereby resulting in a decline in cost performance. Also, emergency stopping is affected when an abnormality is detected, and a system has to be stopped whenever a momentary power failure occurs at the time of year when a momentary power failure or a momentary voltage sag frequently occurs, thus providing poor usability for a user. Furthermore, as in the related art, in a unit that detects an abnormality on a power supply side by using the amount of change in current or voltage, there are, during steady operation, circumstances in which the amount of change in current or voltage increases at the time of activation, stopping, or the like of a system, and thus it is difficult to set a determination value. Hence, if the determination value is not set exactly, false detection is performed due to a change in current or voltage during normal operation, and thus tuning is needed for each model, thereby resulting in an increase in design load.

On the other hand, in the power conversion apparatus 1 in FIG. 1 to FIG. 7, the converter control unit 40 can determine a momentary power failure and a voltage sag by using the already-existing sensors used for control during normal operation. Furthermore, since the switching command value D, which is an output for converter control, is used for determinations of a momentary power failure and a voltage sag, it is easier to set a determination value in comparison with the case where a determination value detected directly with a sensor, such as a voltage or current, is used as in the related art, and thus the reliability of determinations of a momentary power failure and a voltage sag can be increased.

Furthermore, during a time period from when a momentary power failure occurs to when power is restored, switching continues using the predetermined switching command value D. thereby enabling a quick shift to normal control after power restoration, and also a reduction in the frequency of emergency stopping of a system due to an abnormality, such as an overcurrent.

Embodiment of the present invention is not limited to the above-described Embodiment. For example, in determination of power restoration, although the case where it is determined that power has been restored when the reactor current IL is more than or equal to the power restoration threshold value ILref is presented as an example, power restoration may be determined by another technique. For example, the converter control unit 40 may make a determination by using the amount of change in reactor current IL, the number of switching events after the start of an increase in current, or the like, or conditions for power restoration may be changed according to purposes.

Furthermore, in the supply abnormality determination unit 43 in FIG. 1, although the case where the set threshold value Dref is the same as the restriction switching command value Dr is presented as an example, any settings at which switching operation is being performed during a momentary power failure or a momentary voltage sag may be set. For example, set threshold value Dref=0.5 and restriction switching command value Dr=0.3 are set, that is, the restriction switching command value Dr may be set to a value lower than the set threshold value Dref. This can make the ON time Ton at the time of power restoration in Expression (2) shorter, and prevent the occurrence of an overcurrent with certainty.

Even during the occurrence of a momentary power failure, switching continues using a predetermined value, operation is performed intermittently, and a shift to normal control can be performed quickly after power restoration, therefore enabling a reduction in the frequency of emergency stopping of the system due to an abnormality, such as an overcurrent, so as to improve the immunity against a momentary power failure.

In addition, in the above-described Embodiment, although switching operation is performed by using the restriction switching command value Dr when it is determined that a supply abnormality has occurred, the operation of the switching element 13 may be stopped. Even in this case, a determination of an abnormality is made with high accuracy on the basis of the switching command value D, and thus an abnormality can be prevented from occurring in the inverter unit 30, the load M, or the like due to a momentary power failure or the like.

REFERENCE SIGNS LIST 1 power conversion apparatus 2 rectifier 10 converter unit 11 reactor 12 reverse current prevention diode 13 switching element 20 smoothing capacitor 30 inverter unit 31 inverter control unit 40 converter control unit 41 switching command calculation unit 41a voltage command calculation unit 41b current command calculation unit 41c restriction command output unit 41x, 41y filter unit 42 switching control unit supply abnormality determination unit 51 output voltage detection sensor current detection sensor 53 motor current detection sensor 100 three-phase alternating-current power supply D switching command value Dr restriction switching command value Dref set threshold value fs, fs1, fs2 switching frequency IL reactor current ILref current threshold value M load (motor) SS switching signal Ton ON time V0 target command voltage Vd rectified voltage VL output voltage Vs power-supply voltage ΔI amount of current growth

The invention claimed is:

1. A power conversion apparatus comprising:
a rectifier configured to rectify an alternating-current voltage supplied from an alternating-current power supply;
a converter including a reactor connected to an output terminal of the rectifier, a reverse current prevention element connected in series with the reactor, and a switching element connected between the reactor and the reverse current prevention element, and configured to raise a rectified voltage rectified by the rectifier and output the rectified voltage as an output voltage;
a smoothing capacitor configured to smooth the output voltage output from the converter;
a current detector configured to detect a reactor current flowing to the reactor;
a voltage detector configured to detect the output voltage output from the converter; and
a converter control unit configured to control operation of the switching element of the converter,
wherein the converter control unit includes
a switching command calculation unit configured to calculate a switching command value responsive to a ratio of the rectified voltage to the output voltage in accordance with the output voltage detected by the voltage detector and the reactor current detected by the current detector,
a switching control unit configured to control operation of the switching element in accordance with the switching command value calculated by the switching command calculation unit, and
a supply abnormality determination unit configured to determine occurrence of a momentary power failure or a momentary voltage sag in accordance with the switching command value,
wherein, when the supply abnormality determination unit determines that a momentary power failure or a momentary voltage sag has occurred, the switching command calculation unit outputs a preset restriction switching command value, and
wherein the switching control unit controls driving of the switching element in accordance with the restriction switching command value.

2. The power conversion apparatus of claim 1, further comprising an inverter unit configured to convert an output of the converter smoothed by the smoothing capacitor into an alternating-current voltage.

3. The power conversion apparatus of claim 1, wherein, when the switching command value is larger than a set threshold value, the supply abnormality determination unit determines that a momentary power failure or a momentary voltage sag has occurred.

4. The power conversion apparatus of claim 3, wherein the set threshold value is set to a larger value than a maximum switching command value calculated during normal operation.

5. The power conversion apparatus of claim 1, wherein the restriction switching command value is set to a value at which the reactor current after power restoration is prevented from reaching an overcurrent level.

6. The power conversion apparatus of claim 1, wherein, when the supply abnormality determination unit determines that a momentary power failure or a momentary voltage sag has occurred, the converter control unit stops all or part of calculations for the switching command value.

7. The power conversion apparatus of claim 1,
wherein the supply abnormality determination unit determines, when the reactor current exceeds a set current threshold value after determining that a momentary power failure or a momentary voltage sag has occurred, that power has been restored from the momentary power failure or the momentary voltage sag, and
wherein, when the supply abnormality determination unit determines that power has been restored, the switching command calculation unit disables output of the restriction switching command value, and resumes calculating the switching command value responsive to a ratio of the rectified voltage to the output voltage.

8. The power conversion apparatus of claim 1, wherein the reactor has an inductance value at which switching of the switching element is performed once or more than once before the supply abnormality determination unit determines that power has been restored after the alternating-current power supply was restored from a momentary power failure or a momentary voltage sag.

9. The power conversion apparatus of claim 1,
wherein the switching control unit drives the switching element by using a plurality of switching frequencies, and
drives, when it is determined that the momentary power failure or the momentary voltage sag has occurred, the switching element by using higher switching frequency than switching frequency during normal operation.

10. The power conversion apparatus of claim 1, wherein at least one of the switching element and the reverse current prevention element is composed of a wide band gap semiconductor.

11. An air-conditioning apparatus comprising:
the power conversion apparatus of claim 1; and
a motor driven by the power conversion apparatus.

* * * * *